United States Patent

[11] 3,594,907

| [72] | Inventor | Martin S. Schlegel<br>1212 E. Gardenia St., Phoenix, Ariz. 85020 |
|---|---|---|
| [21] | Appl. No. | 809,066 |
| [22] | Filed | Mar. 21, 1969 |
| [45] | Patented | July 27, 1971 |

[54] LINEAR MOTION INDICATOR
2 Claims, 3 Drawing Figs.

| [52] | U.S. Cl. | 33/172 C |
|---|---|---|
| [51] | Int. Cl. | G01b 3/22 |
| [50] | Field of Search | 33/172 C,<br>147 C |

[56] References Cited
UNITED STATES PATENTS

| 1,133,400 | 3/1915 | Rechniowski | 33/147 C UX |
| 1,912,618 | 6/1933 | Bryant | 33/172 C |
| 2,770,885 | 11/1956 | Mapes | 33/172 C |

FOREIGN PATENTS

| 594,548 | 11/1947 | Great Britain | 33/147 (C) |
| 144,700 | 3/1961 | U.S.S.R. | 33/172 (C) |

Primary Examiner—Robert B. Hull
Attorney—Martin L. Stoneman

ABSTRACT: A linear motion indicator for use on power-driven machinery. The indicator has a slidable plunger that communicates with the movable portion of the machine. A hydraulic system, responsive to movement of the plunger, includes a resiliently compressible slave piston proximate a delineated scale.

PATENTED JUL 27 1971 3,594,907

INVENTOR.
MARTIN S. SCHLEGEL
BY Martin L. Stoneman
ATTORNEY

LINEAR MOTION INDICATOR

BACKGROUND OF THE INVENTION

This invention relates to precision measuring instruments.

More particularly, the invention concerns a micrometer reading linear motion indicator.

In a further aspect, the invention concerns a precision linear motion indicator especially adapted for use in vibratory situations and to be impervious to the undulations thereof.

Numerous routine exercises performed with operating machinery, of the type commonly employed in laboratories and machine shops, require exacting measurement of the linear motion or travel of a specified element of the machine.

An exemplary machine is the conventional drill press. To assist the operator in gauging the depth to which a hole is drilled, the drill is normally fitted with two devices. The first is a scale or ruler coupled with a pointer synchronous with the linear travel of the drill. The second device consists of an adjustable stop which delimits travel of the drill-carrying spindle at a predetermined depth.

While either device serves its intended purpose adequately, neither was devised for micrometer precision. Both devices are dependent upon the operator's ability to read a ruler. A skilled operator, using a finely graduated scale, may be able to achieve an accuracy of approximately ten-thousandths of an inch. However, when the scale is incorporated with an operating, and therefore vibrating, machine, the operator's normal scale reading ability is seriously impaired. Additionally, inherent with the adjustable stop device is the inability to determine, by an degree of measurement, the approach of the limit of travel.

It has become universal practice, therefore, when an operator desires to drill holes of precision depth and to be forewarned of the approach of this depth, to modify the drill press to include a dial indicator actuated by a solid component of the moveable portion of the machine. Dial indicators may be obtained in varying degrees of accuracy and range of operation.

Theoretically, an operator employing a standard, commercially available indicator graduated in one-thousandths of an inch and having fifty-thousandths range should be able to observe the last fifty-thousandths travel of the drill and be able to stop within one-thousandths of the desired depth. Unfortunately such indicators are mechanical devices dependent upon springs, counter balances, and an extending pointer arm. They are highly sensitive to the undulations created by the motor and other operative components of the machine. Undesirable vibrations are further recorded by operating machinery within the immediate vicinity, as for example several drill presses "on-line." The operator desirous of drilling to an exacting depth is forced to interpolate the neutral position as the pointer arm oscillates in a range not uncommonly encompassing ten-thousandths in either direction of a true reading.

While the example given hereinabove specifically cites the drill press, those familiar with machine operation will readily recognize the parallel situations commonly encountered with jig bores, milling machines, tension testing devices, and other equipment where precision measurement of linear motion is critical.

It would be highly advantageous, therefore, to provide a precision linear motion indicator adapted for vibratory application.

SUMMARY OF THE INVENTION

Accordingly, it is a primary object of the present invention to provide an improved linear motion indicator.

Another object of the present invention is the provision of a linear motion indicator especially adapted for gauging the stroke of a power-driven machine.

Still another object is to provide a linear motion indicator in which neither the accuracy nor the readability is impaired when said indicator is employed in vibratory applications.

Yet still another object of the present invention is the provision of an indicator of the above type having minimal moveable mechanical elements, and therefore relatively inexpensive to manufacture, and exhibiting a high degree of durability and low maintenance serviceability.

Briefly, to accomplish the desired objectives of my present invention in accordance with a presently preferred embodiment thereof, I provide a generally boxlike housing suitable for clamping, drilling and tapping for threaded engagement, or otherwise adapted for suitable temporary or semipermanent attachment to the appropriate machine. A shaft, slidable within the housing, extends outwardly therefrom. The shaft is adapted at its outer terminus to abut and move in response to the traveling component of the machine. Outward spring biasing maintains continuous contact between the shaft end and the machine part.

A diaphragm, located within the housing and peripherally secured thereto, is operationally responsive to sliding movement of the shaft. A cavity on either side of the diaphragm forms a divided fluid reservoir. A transparent tube is located within the upper surface of the housing. A conduit extending from either end of the tube through the housing communicates with respective sides of the divided fluid reservoir.

Students versed in hydraulic principles recognize that fluids are not compressible. Accordingly, as the diaphragm moves in one direction, fluid is displaced from the high-pressure side of the reservoir through the adjoining conduit to the tube. Fluid thus forced from the tube enters the second conduit for transmission to the low-pressure side of the diaphragm and respective reservoir.

The tube is of sufficient length that the volume of fluid contained therein exceeds the total volume expelled by maximum diaphragm deflection. An hydraulic slave piston, slidable within the tube, is displaced along the length thereof in definite and accurate response to he precise deflection of the diaphragm. A linear scale mounted parallel to the tube serves to measure finite movement of the piston. A circumferential indicator mark on the piston facilitates easy and accurate reading.

Those skilled in the art will readily recognize that, due to the area differential between the diaphragm and the tube, for any given positive travel of the shaft, the piston will travel a greater distance than the deflection of the diaphragm. However, a constant ratio is maintained between shaft travel and piston travel. This constant ratio of movement permits the use of an extended or amplified scale to enhance readability.

BRIEF DESCRIPTION OF THE DRAWINGS

Further and more specific objects and advantages of the present invention will become readily apparent to those skilled in the art from the following detailed description thereof taken in conjunction with the drawings, in which.

DETAILED DESCRIPTION OF THE PREFERRED EMBODIMENT

Figure 1:
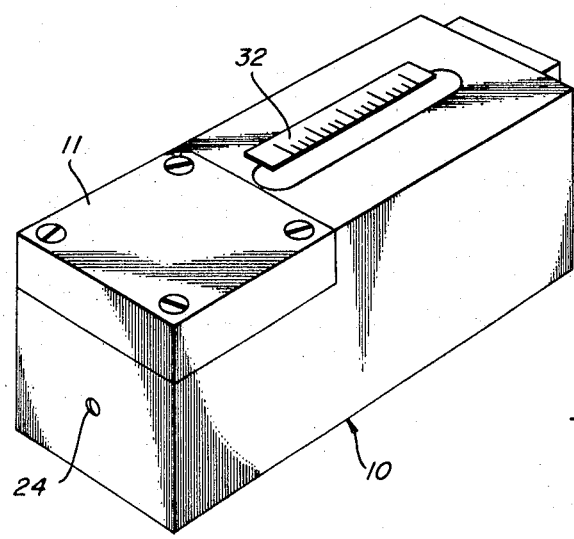
FIG. 1 is a perspective view of a linear motion indicator chosen for purposes of illustrating a presently preferred embodiment of the invention.
Figure 2:
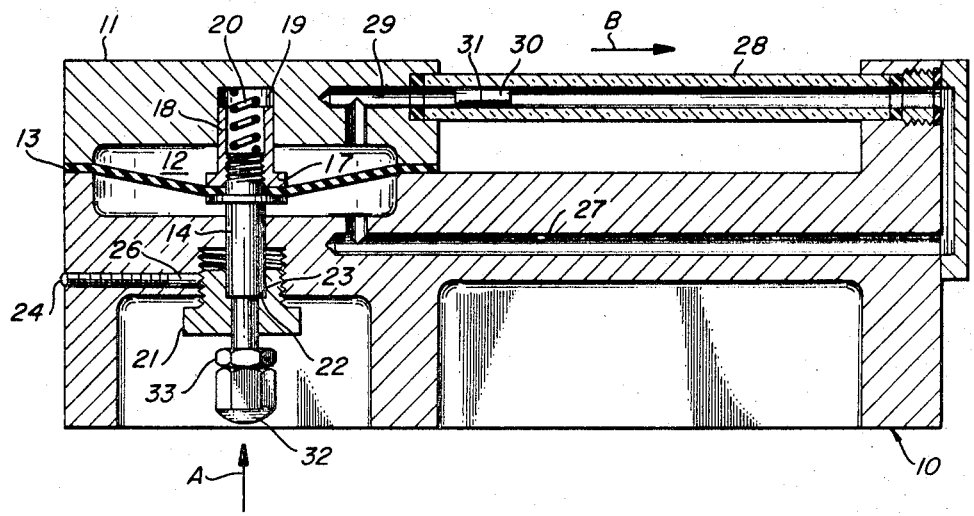
FIG. 2 is an elevational view, in section, of the device of FIG. 1 illustrating the internal elements thereof.

Turning now to the drawings, in which the same reference numerals indicate corresponding elements throughout the several views, FIGS. 1 and 2 illustrate a presently preferred embodiment of the invention chosen for purposes of illustration and show the boxlike housing 10 having a detachable cover portion 11. A cavity 12 functions as a fluid reservoir. A flexible diaphragm 13 divides the reservoir into an upper and a lower chamber. A plunger 14, vertically slidable within the housing 10, is secured to the diaphragm 13 such that vertical movement of the plunger 14 causes a corresponding vertical displacement of the diaphragm within the hydraulic reservoir. The diaphragm retaining nut 17 has an upwardly annular extension 18 slidable within he bore 19 located in the undersurface of the removable top 11. A spring 20 within the annular extension 18 downwardly biases the plunger 14. A nut 21, threadedly engaging the undersurface of the housing 10, having an internal bore, guides the lower portion of the plunger 14. An annular shoulder 22, within the bore of the nut 21, abuts an annular shoulder 23 of the plunger 14 to delimit the downward travel of said plunger. A set screw 24, threadedly engages the housing 10 to abut a plastic or Teflon plug 26 to lock the nut 21 at any desired presetting.

A conduit 27, extending through the housing 10, communicates with the lower portion of the hydraulic reservoir and one end of the transparent tube 28. A second conduit 29 communicates between the upper portion of the hydraulic reservoir and the second end of the transparent tube 28. A piston 30, having an annular indicator mark 31, sealingly engages the internal diameter of the transparent tube 28, but is slidable therein. A graduated indicator 32 carried on the upper surface of the housing 10 parallel to the tube 28 references lateral movement of the piston 30.

As specifically shown in FIG. 2, upward movement of the plunger 14 in the direction of the arrow A, as dictated by a moveable portion of a machine tool, flexes the diaphragm 13 upwardly to displace fluid from the upper portion reservoir 12 through the conduit 29 into the tube 28, resulting in a lateral displacement of the piston 30 in the direction of the arrow B. An amount of fluid corresponding to that entering the tube 28 through the conduit 29 is displaced from the tube 28 through the conduit 27 into the lower portion of the reservoir 12. Inasmuch as this is a closed hydraulic system, it will be readily apparent to those skilled in the art that the piston 30 will travel in either direction in direct response to movement of the plunger 14 in accordance with a constant ratio (proportionate movement) as hereinbefore described. Micromovements of the plunger 14 are thereby amplified to proportions suitable for visual detection, and readable by the movement of the indicator mark 31 in correspondence with the scale 32. The indicator mark 31 may be preset to an initial at rest reading by adjustment of the nut 21. Further, the effective length of the plunger 14 may be adjusted by rotation of the ball-end nut 32 threadedly engaging the lower end of the plunger 14. The ball-end nut 32 is positionally retained by a lock nut 33.

Figure 3:
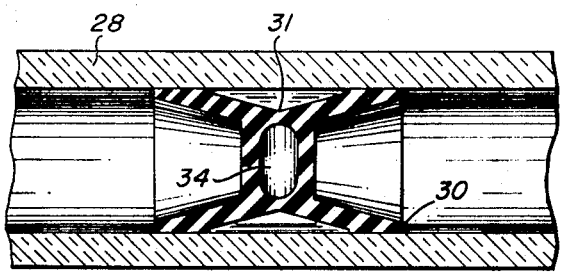
FIG. 3 is an enlarged fragmentary sectional view specifically detailing the slave piston of the invention.

FIG. 3 is an enlarged sectional view of the piston 30 and an adjacent portion of the tube 28. A pocket 34 within the semiresilient piston 30 provides for expansion and contraction of the hydraulic fluid within the system due to atmospheric changes.

Various changes in the device herein chosen, for purposes of illustration, will readily occur to persons skilled in the art. An obvious modification is the substitution of an enlarged hydraulic piston operating within the reservoir 12 to functionally replace the diaphragm 13. Such modifications and variations, while not explicitly denoted in the foregoing detailed description of the preferred embodiment, do not deviate from the teachings of the present invention and are intended to be included in the spirit and scope thereof, and must be made with a fair interpretation of the following claims.

Having fully disclosed and described the present invention, and the presently preferred embodiment thereof, in such clear and concise terms as to enable those skilled in the art to understand and practice the same, I claim:

1. A linear motion indicator adapted to provide precise visual measurement of the travel of the movable portion of a power-driven machine tool and further adapted to minimize the effect of the vibrations of said machine upon the accuracy of said indicator, said linear motion indicator comprising:
   a. a housing adapted for attachment to a power-driven machine;
   b. a hydraulic reservoir located within said housing and having a high pressure side and a low-pressure side;
   c. a plunger slidable within said housing and adapted at its lower end to communicate with the movable portion of said machine and adapted at its upper end to communicate with said hydraulic reservoir;
   d. means to vary the volume of the high-pressure side of the reservoir in response to the slidable movement of said plunger; and
   e. indicator means responsive to the volumetric change in the high pressure side of said reservoir, said indicator means including:
      1. a tubular member having a first end and a second end;
      2. a slave piston slidable within said tubular member and sealingly engaged therewith;
      3. a first conduit communicating between the high pressure side of said reservoir and said first end of said tubular member;
      4. a second conduit communicating between said low pressure side of said reservoir and said second end of said tubular member; and
      5. a scale proximate said tubular member.

2. The linear motion indicator of claim 1 wherein said slave piston is resiliently compressible to accommodate expansion and contraction of hydraulic fluid within said indicator.